INVENTOR:
WILLIAM L. ROEVER
BY: *John R. Williams*
HIS ATTORNEY

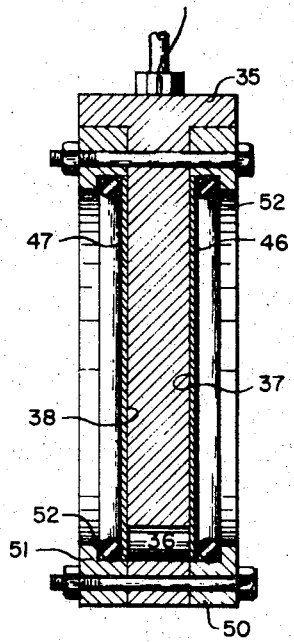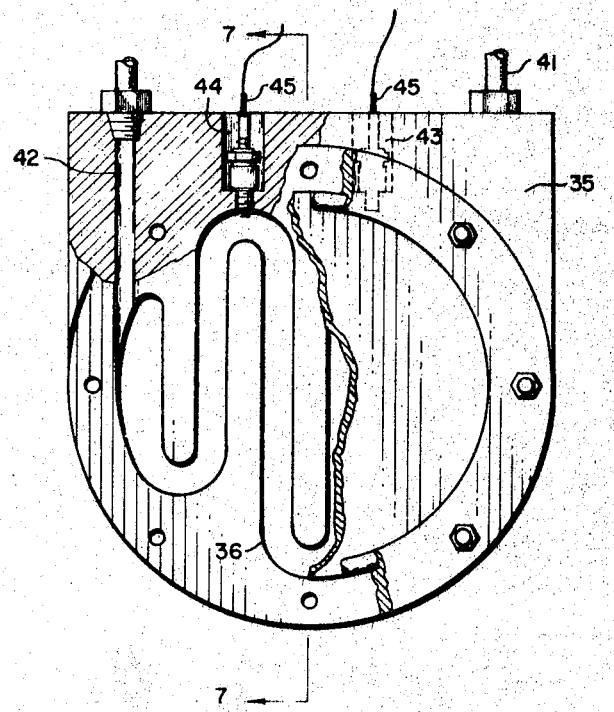
FIG. 7
FIG. 6

United States Patent Office 3,233,694
Patented Feb. 8, 1966

3,233,694
HIGH ENERGY ACOUSTIC IMPULSE SOURCE
William L. Roever, Bellaire, Tex., assignor to Shell Oil Company, New York, N.Y., a corporation of Delaware
Filed Aug. 10, 1962, Ser. No. 216,213
14 Claims. (Cl. 181—.5)

The present invention pertains to an apparatus for producing high energy acoustic impulses. More specifically, the invention is directed to a durable acoustic impulse source particularly suited for portable use where available operating space is limited.

The apparatus, as will be developed subsequently, has particular application in the seismic surveying of relatively confined water-covered areas. Although the subsequent disclosure will be directed primarily to this application, it is to be understood that the use of the apparatus is not limited to this particular application. For example, it is anticipated that the apparatus could be equally well used for seismic surveys of large bodies of water or land areas, as a source of acoustic energy in a borehole, as an acoustic source in fathometer apparatuses, as an acoustic source in sounding devices for submarine detection, or in other varied applications utilizing acoustic impulses. Thus, the following description and accompanying illustrations are merely intended to be exemplary of the invention.

In a copending patent application entitled, "Seismic Surveying System for Water-Covered Areas," of Noyes D. Smith, Jr., filed June 6, 1960, Serial Number 34,028, and my copending patent application entitled, "Seismic Sound Source," filed June 22, 1961, Serial Number 118,934, now Patent No. 3,176,787, there are described methods and alternative apparatuses for conducting a seismic survey of water-covered areas. These copending applications disclose methods of seismic surveying in which an enclosed and expansible explosive sound source is towed through the water by a vessel and periodically activated to generate seismic impulses. The seismic impulses so generated are received by a plurality of detectors which are also streamed behind the towing vessel. The copending applications also described methods by which an explosive mixture of gas may be introduced into flexible and expansible tube-like structures and then exploded to provide an acoustic impulse. In the methods described, acetylene and oxygen are introduced into said tube-like structures, then mixed and exploded by an ignition device. The force of the gas thus exploded, exhausts expended gas through an outlet means on the tube structure and permits a new charge of gas to be introduced thereinto. Although the apparatuses of the aforementioned applications produce effective results, their use becomes limited in confined and shallow waters. This limitation results primarily from the relatively large towing vessels used in combination with the apparatuses. In addition, the relatively large and freely suspended acoustic source and detector units of these applications are not well adapted for convenient and accurate positioning in shallow and confined waters.

The flexible and expansible structures of the copending applications also have the disadvantage that their useful life is relatively limited. This limitation results mainly from the continued flexing and expansion of the structures upon each explosion therein. Furthermore, the flexible materials from which the structures are fabricated is subject to damage during handling due to abrasion or tearing.

In addition to the acoustic sources of the aforementioned applications, spark-type sound sources have been utilized in the seismic exploration of water-covered areas. Such sources have the disadvantage that they require a great bulk of equipment to support their operation, including such items as generators and high voltage power supplies. The requirement of such supporting equipment necessitates the use of relatively large floating structures in combination with such sound sources. Thus, because of the bulky equipment, spark-type sound sources are not well suited for use in shallow or confined waters that will not accommodate a relatively large boat.

The apparatus of the present invention also offers advantages over acoustic sources utilizing fixed explosion chambers having relatively large spherical or bell-shaped configurations with an open or expansible side to provide for expansion of an exploded medium therein. Such fixed explosion chambers have the disadvantage that useful expansion of an explosive medium therein is limited. This limitation, in turn, results in ineffective use of the explosive medium towards the production of an acoustic impulse. Open sided explosion chambers are particularly disadvantageous, since they are not well suited for underwater use and they do not effectively control the explosion for production of a useful acoustic impulse.

It is noted, that in order to provide the largest amount of useable acoustic impulse energy from the explosion of any given amount explosive medium, such as oxygen and acetylene gas, the gas resulting from the explosion should be able to freely expand as much as possible during a time equal to the duration of the desired pressure pulse. In order to provide for such expansion, the impulse source of the present invention incorporates an explosion chamber initially having a thin areally extensive shape bounded by at least one freely movable surface to permit a maximum increase in volume with a relatively small displacement of the movable surface or surfaces. After expansion due to the explosion of a medium therein, the chamber is adapted to quickly reassume its initial configuration for reintroduction of an explosive medium thereinto. The frequency spectrum of the radiated pulse may be controlled by adjusting the relative dimensions of the explosion chamber.

The development of the present invention provides a device ideally suited for use in shallow and confined water-covered areas. Furthermore, the source of the present invention provides an acoustic impulse having a controlled and defined frequency range. Through this control, the energy dissipated in the acoustic source may be utilized to the highest degree. The high utilization of energy, in turn, results in a minimization of seismic detection interference due to unutilized energy expended in the production of coincident interference. For example, such unutilized energy functions to produce bubbles within the water and/or undesirable acoustic frequencies which interfere with the accurate delineation and identification of seismic reflections.

The present invention also provides for the accurate and controlled introduction of a compound gaseous explosive medium into the acoustic impulse source. The introduction is accomplished through a reliable arrangement well adapted for synchronization with apparatuses used in combination with the acoustic source. This provision minimizes fouling and destruction by undesirable ignition of the explosive medium and facilitates the production of accurate results.

In addition to providing for the controlled introduction of an explosive medium into the impulse source, the acoustic impulse source of the present invention is provided with means to accurately control detonation of the explosive medium therein. The latter provision is important, since burning of an explosive medium prior to the detonation point is erratic and leads to indefiniteness in the time after ignition at which the maximum pressure in the source occurs. The present invention avoids the problem of the erratic burning velocity prior to detonation by controlling the geometry of the impulse source in the area wherein the explosive medium is ignited. This control results in the rapid attainment of detonation velocity so that the time of maximum pressure occurs at a relatively constant time (variation less than 0.1 millisecond) after the ignition. Detonation in the impulse source of the present invention is stable once detonation velocity is established, since a detonation front is quickly propagated through the explosive medium without dropping below detonation velocity.

The present invention is particularly suited for seismic exploration, since it is adapted to rapidly generate repeated acoustic impulses to achieve a continuous seismic profile. The design of the apparatus of the invention facilitates such use, since the motion of movable elements is relatively limited. This limited motion is accompanied by a resultant long operational life and accurate control characteristics.

An object of this invention is therefore to provide a compact and versatile source of high energy acoustical impulses. The compact nature of the apparatus is not limited to the source itself, but extends to the supporting equipment used in combination therewith.

Another object of the invention is to provide a source of high energy acoustic impulses well suited for use in the seismic exploration of water-covered areas.

Another object of the invention is to provide an acoustic impulse source capable of utilizing an explosive medium to derive the largest amount of useable acoustic energy therefrom.

Another object of the invention is to provide an acoustic impulse source utilizing a gaseous explosive medium and having means to accurately and reliably control the introduction of the medium into the source.

Another object of the invention is to provide an apparatus to rapidly generate repeated high energy acoustic impulses with selected frequency to obtain continuous seismic profiles. With respect to this object, it is a further and related object of this invention to provide an apparatus capable of producing such repeated acoustic impulses while having a relatively long operational life.

Another object of the invention is to provide an apparatus for producing high energy acoustic impulses wherein the impulse frequency and the acoustic frequency can be accurately controlled and maintained.

Yet another object of the present invention is to provide a source of high energy acoustic impulses wherein a maximum amount of the energy dissipated in the source is directed towards generation of a useable impulse, and a minimum amount of energy is dissipated in the generation of coincident interfering impulses.

The above, and other objects of the invention will become apparent from the following description and accompanying illustrations.

Broadly, the high energy acoustic impulse source of the present invention comprises a plurality of fluid impermeable members that are interconnected in juxtaposed relationship to define a relatively thin and areally extensive chamber therebetween. At least one of said members comprises a diaphragm means disposed for limited translation with respect to the other of said members. The chamber defined by said members is provided with conduits in communication therewith for introduction and exhaustion of an explosive medium, and with ignition means to ignite the explosive medium in the chamber.

In operation, the explosive medium is introduced into the chamber, exploded, and exhausted therefrom. The explosion of the medium translates the members away from their juxtaposed relationship and creates a high energy acoustic impulse. The force of the explosion also functions to exhaust expended explosive medium through the exhaust conduit communicating with the chamber. Upon exhaustion of the expended explosive medium from the chamber, the members return to their juxtaposed relationship and the source is again in condition for the introduction, ignition and exhaustion of a new charge of explosive medium. Through repetition of this cycle, the source may be utilized to rapidly generate successive high energy acoustic impulses.

The utility and operation of this invention will be more easily acertained from the following detailed description of preferred embodiments when taken in conjunction with the attached drawings, in which:

FIGURE 6 is a plan view of another embodiment of the acoustic impulse source of the present invention;

FIGURE 7 is a vertical section of the embodiment of FIGURE 6 taken on line 7—7 thereof;

Figure 1:
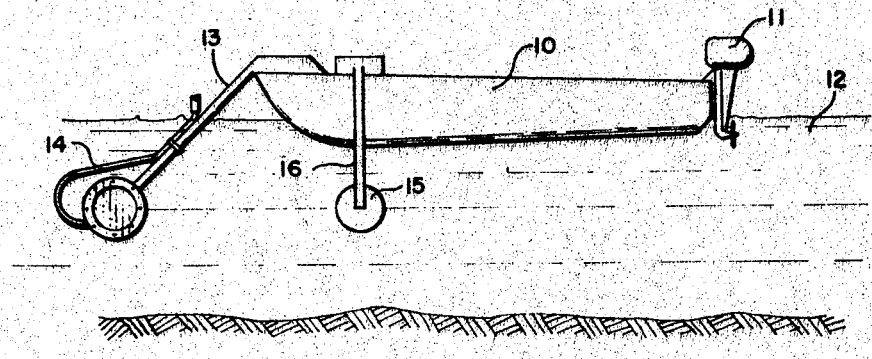
FIGURE 1 is a diagrammatic representation of a small vessel utilizing the high energy acoustic source of the invention for the seismic exploration of a shallow body of water.

Referring now to FIGURE 1, therein is shown a small vessel 10 of approximately 16 feet in length powered by an outboard motor 11 over the surface of a relatively shallow body of water 12. A source of high energy acoustic impulses, to which the present invention is primarily directed, is secured to the vessel 10 by a support arm 13 extending below the surface of the body of water 12. As illustrated, the acoustic source is disposed vertically within the body of water and has an exhaust conduit 14 communicating therewith and extending along the support arm 13 to a position above the surface of the body of water 12. Although the acoustic source has been illustrated in a preferred vertical position, it is to be understood that this position may be varied without departing from the invention. Supply conduits, such as electrical ignition leads and conduits for explosive medium, preferably communicate with the acoustic source through a passage in the support arm 13. A seismic detector 15 is shown submerged in the body of water 12 by a suspension arm 16. In operation, the detector 15 is coupled to a seismic recording apparatus carried by the vessel 10, and may be disposed relatively near to the acoustic source, for example, 4 to 6 feet therefrom. The exact relative positioning of the acoustic source and the detector is dependent on the depth of water being explored and the nature of the strata disposed therebeneath.

Figure 2:
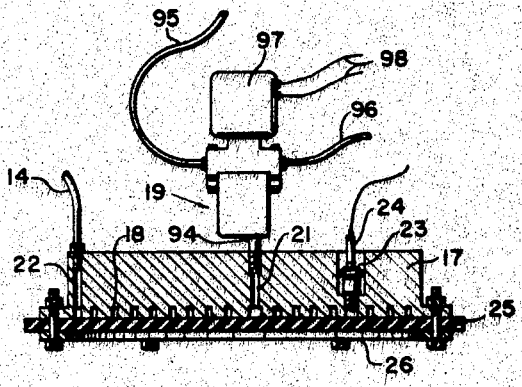
FIGURE 2 is a vertical cross-section of an embodiment of the acoustic impulse source of the invention.
Figure 4:
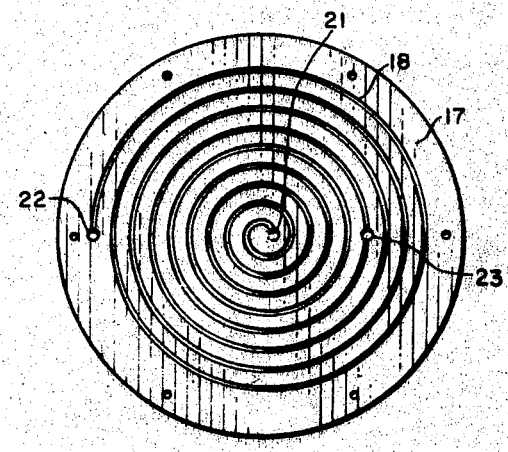
FIGURES 4 and 5 are plan views of alternative forms of grooved plates adapted to be used with the embodiments illustrated in FIGURES 2 and 3.

FIGURE 2 illustrates an embodiment of the acoustic impulse source adapted to be used in a combination as illustrated in FIGURE 1. In FIGURE 2, the numeral 17 designates a main support plate having a substantially spiral shaped groove 18 formed in the surface thereof. A control valve 19, as will be described subsequently, is shown in the position it assumes during operation of the impulse source. FIGURE 4 illustrates a preferred form of the spiral shaped groove in the plate 17. The plate 17 has an inlet conduit 21 communicating with the center of the spiral shaped groove 18 to provide for the introduction of an explosive medium thereinto and an outlet or exhaust conduit 22 extending into communication with the groove 18 to provide for the exhaustion of expended explosive medium therefrom. Preferably, the explosive medium introduced into the groove 18 is a mixture of the oxygen and acetylene gases. The plate 17 is also provided with a passage 23 communicating with the groove 18 for the introduction of an ignition charge thereinto. The ignition charge is produced by a relatively conventional spark plug 24 threaded into the passage 23 and having electrodes extending into the groove 18.

In the FIGURE 2 embodiment of the invention, a flexible diaphragm 25 is secured in juxtaposed relationship to the surface of the plate 17 by an annular ring 26. With the flexible diaphragm 25 so positioned, the boundaries of the groove 18 and the surface of the diaphragm 25 juxtaposed against the plate 17 define an areally extensive chamber of spiral-shaped configuration. The conduits 21 and 22 and the passage 23 communicate with this chamber and provide, respectively, for the introduction, exhaustion and ignition of an explosive medium.

Figure 3:
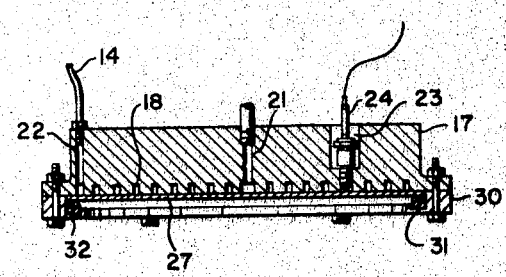
FIGURE 3 is a vertical section of another embodiment of the acoustic impulse source of this invention.

FIGURE 3 illustrates an embodiment of the invention similar to that illustrated in FIGURE 2. Although the valve 19 is not shown in FIGURE 3, it is to be understood that it would assume a position corresponding to that illustrated in FIGURE 2. Like numerals in FIGURES 2 and 3 designate corresponding parts. Thus, upon observation, it is apparent that the plate in the embodiment of FIGURE 3 is identical to that of the plate 17 in FIGURE 2. The FIGURE 3 embodiment differs from that of FIGURE 2 in the details of the diaphragm and diaphragm securing structure used in combination therewith. The diaphragm 27 of the FIGURE 3 embodiment comprises a thin rigid plate element fabricated of steel or the like. The rigid diaphragm 27 is secured in juxtaposed relationship to the grooved surface of the plate 17 for limited translation with respect thereto by an annular retainer 30 fixed to the lower surface of the plate 17 and extending around the periphery of the diaphragm. A flange 31 extends radially inward from the inner periphery of the annular retainer 30 and functions to support the diaphragm 27 through a resilient O-ring 32 interposed between said flange and the diaphragm. Through this arrangement, the diaphragm 27 is resiliently biased against the grooved surface of the plate 17 for limited translation with respect thereto. By varying the compressibility of the O-ring and/or the compressing force applied to the O-ring, the force with which the diaphragm 27 is biased against the plate 17 may be adjusted. The latter mentioned adjustable characteristic and the durable nature of the resilient O-ring used in the FIGURE 3 embodiment make it particularly suitable for the production of controlled and repeated acoustic impulses.

Figure 5:
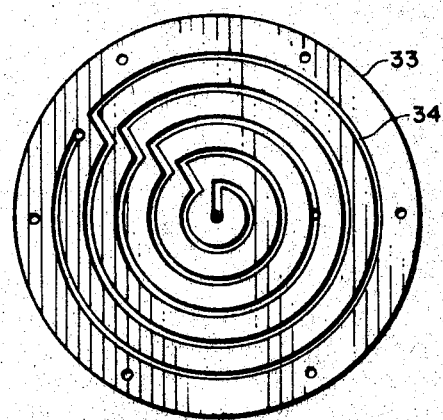

FIGURE 5 illustrates a modified form of plate configuration adapted to be used in embodiments as described with reference to FIGURES 2 and 3. The plate 33 illustrated in FIGURE 5 differs from that of the plate 17 shown in FIGURES 2, 3 and 4 only in the configuration of the groove form in the surface thereof. This groove, designated as 34, is similar to the groove 18 of the plate 17 in that it is tortuous and areally extensive. The groove 34 differs from the groove 18 in that it is not a true spiral, but is rather a series of circular grooves connected and blocked to produce a substantially spiral like configuration. The substantially spiral shaped groove 34 has the advantage that it may be formed on relatively conventional tools capable of cutting only circular and straight grooves.

FIGURES 6 and 7 illustrate another embodiment of the high energy acoustic impulse source of the invention. This embodiment differs from those previously described mainly in that it employs a pair of diaphragms rather than a single diaphragm. In this embodiment, the numeral 35 designates the main support plate to which the components of the acoustic impulse source are secured. The plate 35 has a tortuous areally extensive opening 36 extending through the opposed flat surfaces 37 and 38 thereof. The plate 35 is also provided with inlet and outlet conduits 41 and 42, respectively, extending therethrough into communication with the opening 36. Although not illustrated, during the operation of this embodiment a valve 19, as shown in FIGURE 2, would be coupled to the inlet conduit 41. Passages 43 and 44 extend through the plate 55 into communication with the intermediate portion of the opening 36 and are adapted to receive spark plug type ignition means 45 having electrodes extending into the opening 36.

A pair of diaphragms 46 and 47 are juxtaposed against the opposed sides of the plate 35 having the opening 36 extending therethrough. In this juxtaposed relationship, the inner surfaces of the diaphragms and the boundaries of the opening 36 form a closed areally extensive chamber. The diaphragms 46 and 47 are secured to the plate 35 by flanged annular retaining members 50 and 51 fabricated and functioning similar to the annular retainer 30 of the FIGURE 3 embodiment. Resilient O-rings 52 are interposed between the flanges on the annular retaining members 51 and 52 and the peripheral surfaces of the diaphragms 46 and 47 to resiliently bias said diaphragms into juxtaposed relationship with respect to the opposed surfaces of the plate 35. Through this arrangement, the diaphragms 46 and 47 are resiliently biased against the plate 35 for limited translation with respect thereto. As in the FIGURE 3 embodiment, the force with which the diaphragms are held against the plate 35 can be adjusted by varying the compressibility of the O-rings 52 and/or the compressing force applied to said O-rings.

The embodiment of the invention described with reference to FIGURES 6 and 7 has the advantage that it provides for expansion of an exploded medium within the opening 36 in opposed directions. Such opposed expansion results in opposed reactive forces and thus minimizes the amount of force transferred to any structure supporting the impulse source structure. The opposed expansion also has the advantage that it provides maximum utilization of the explosive energy toward the creation of the desired acoustic impulse and minimum dissipation of the explosive energy in the creation of undesired disturbances, such as bubbles, and interfering acoustic frequencies. The use of plural diaphragms is particularly advantageous because it increases the degree to which an explosive medium may expand within the source and thus increases the energy of the acoustic impulse generated by the source.

Figure 9:
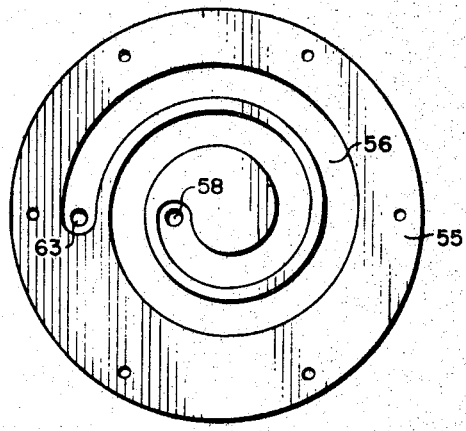
FIGURE 9 is a plan view of the grooved plate to be used with the embodiment of FIGURE 8, with the diaphragm and diaphragm securing assembly removed therefrom.
Figure 8:
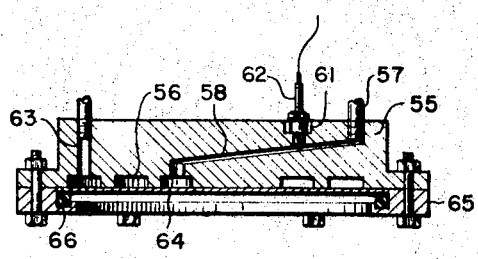
FIGURE 8 is a vertical section of yet another embodiment of the acoustic impulse source of the invention.

Referring now to FIGURES 8 and 9, therein is illustrated yet another embodiment of the high energy acoustic impulse source of the present invention. This embodiment differs from those previously described primarily in that it is provided with an ignition chamber adapted to establish a detonation front externally of the explosion chamber of the source. This difference may be accompanied by a modified form of explosion chamber, as will be exemplified with reference to the illustration. In FIGURES 8 and 9, the numeral 55 designates a main support plate having a relatively broad substantially spiral shaped groove 56 formed in the surface thereof. It is noted that groove 56 is broader than the grooves or openings described with reference to the preceding embodiments and that, as a result, the spiral shown in FIGURE 9 has fewer turns than the aforedescribed spiral grooves. The support plate 55 of the FIGURE 8 and 9 embodiment differs substantially from the support plates of the aforedescribed embodiments in that the inlet conduit 57 thereof communicates with the groove 56 through a detonation passage 58. The plate 55 is also provided with a passage 61 communicating with an intermediate portion of the detonation passage 58 to provide for the introduction of an ignition charge thereinto. The ignition charge is produced by a relatively conventional spark plug 62 threaded into the passage 61 and having electrodes extending into the detonation passage 58. The plate 55 further includes an outlet or exhaust conduit 63 extending therethrough into communication with the outer end of the spiral shaped groove 56.

As clearly illustrated in FIGURE 8, a rigid diaphragm 64, corresponding to the diaphragm 27 described with reference to FIGURE 3, is secured in juxtaposed relationship to the grooved surface of plate 55. The rigid diaphragm 64 is resiliently secured to the plate 55 for a limited translation with respect thereto through means of an annular retainer 65 and a resilient O-ring 66 corresponding identically to the annular retainer 30 and resilient O-ring 32 described with reference to the FIGURE 3 embodiment. Through this arrangement, the force with which the diaphragm 64 is biased against the plate 55 may be adjusted by either varying the compressibility of the O-ring and/or the compressing force applied to the O-ring. With the diaphragm 64 juxtaposed against the plate 55, the boundaries of the groove 56 and the surface of the diaphragm juxtaposed against the plate define an areally extensive chamber of spiral shaped configuration. The conduits 57 and 63 provide for the introduction and exhaustion, respectively, of an explosive medium from this chamber and the passage 58 provides for the ignition of the explosive medium within the chamber. During operation of the FIGURE 8 and 9 embodiment of the invention, a control valve 19 as illustrated in FIGURE 2 is preferably coupled to the inlet conduit 57.

It is noted, that normally when an explosive mixture of gas, such as oxygen and acetylene anticipated to be used in the source of the present invention, is ignited by a low energy spark the gas begins to burn at the point of ignition. As this burning advances through the gas, the rate of advance will increase under favorable conditions until a detonation front is established with a constant high velocity. For example, in a mixture of oxygen and acetylene gases a detonation front might be established at a pressure of 22 atmospheres and a temperature of 1500° F. In the acoustic impulse sources of the present invention it is desirable to make the burning time prior to the establishment of a detonation front as short as possible, since the velocity of burning is erratic and leads to indefiniteness in the time after ignition when the maximum pressure and resultant impulse occurs. With the sources of the present invention, it has been found that the problem of erratic burning can be avoided by controlling the geometry of the area near the point of ignition to quickly establish detonation conditions of temperature and pressure in the close vicinity of the point of ignition. Thus, a detonation front is quickly established and maximum pressure and the resultant impulse occurs at quite a constant time after the ignition, for example, with a variation of less than 0.1 millisecond. After a detonation front is established, it is quite stable so that it may be propagated through a combustion chamber, such as the aforedescribed areally extensive chambers without dropping below detonation velocity.

In the impulse sources described with reference to FIGURES 2 to 7, ignition occurs within the areally extensive chambers, and the geometry of the area near to the point of ignition is controlled to limit this area to a relatively small volume, thus facilitating the rapid attainment of detonation pressure and temperature upon ignition and the quick establishment of a detonation front. The detonation passage 58 of the embodiment of FIGURES 8 and 9 is of limited size and controlled geometry near the ignition point of the spark plug 62. This design promotes the rapid establishment of a detonation front within the passage 58 upon the ignition of the gas disposed therein. The front thus established is quite stable and is propagated into and through the areally extensive chamber formed by the groove 56 without dropping below detonation velocity.

The use of an ignition passage or chamber, such as the passage 58, disposed externally of the areally extensive combustion chamber has the advantage that the combustion chamber need not be designed so as to facilitate establishment of a detonation front therein. It is noted that the rapid establishment of a detonation front within the combustion chamber requires that the chamber be of limited size in order to quickly establish critical detonation pressure and temperature. This limited size, in turn, functions to limit the frequency spectrum of the source, since the acoustic frequencies produced by the source are largely dependent on the size and in particular the thickness of the areally extensive combustion or explosion chamber. Thus, it is believed apparent that the establishment of detonation front externally of the combustion chamber has the advantage that the combustion chamber design and the acoustic frequencies produced as a result of that design are not limited by the design of the ignition chamber. For example, although not illustrated, it is anticipated that the areally extensive chamber of the FIGURE 8 and 9 embodiment could be disc shaped rather than the illustrated tortuous spiral shape. Ideally, the acoustic impulse sources of the present invention produce frequencies of 1000 to 100 or less cycles per second and these frequencies are controlled largely by the design and size of the areally extensive combustion chambers.

The operation of the aforedescribed embodiments of the invention will now be described with respect to their application in the seismic exploration of shallow waters, as illustrated in FIGURE 1. It is noted, that although the structures of the different described embodiments have different physical characteristics, the sequence of their operation is substantially the same.

In the application as shown in FIGURE 1, the acoustic source is supported beneath the surface of the body of water by the support arm 13. Preferably, the support arm 13 is provided with means to adjust the vertical disposition of the source with respect to the surface of the body of water 12. Since the acoustic impulse sources of this invention are essentially nondirectional, the sources may be disposed vertically within the water as illustrated in FIGURE 1. After the acoustic impulse source has been disposed at the desired position, the detector 15 is suspended in the water in relatively close proximity to said source. The exact disposition of the source and detector with respect to each other is dependent on the depth of water being explored and the nature of the strata therebeneath.

In operation, the detector 15 is coupled to a relatively conventional seismic recorder carried by the vessel 10. Due to the limited size of the vessel 10, this recorder is preferably as compact as possible. The vessel 10 also carries oxygen and acetylene sources for use as the explosive medium in the impulse source, and a source of electrical energy, such as a battery, to be used in the ignition of the medium. The sources of oxygen and acetylene are maintained in a separated state on the vessel and are conveyed to the impulse source through conduits for mixture within said source. The valve 19 is interposed between the oxygen and acetylene sources on the vessel and the impulse source to selectively control the introduction of oxygen and acetylene into said source. An electrical lead extends between the source of electrical energy on the vessel 10 and the spark ignition means in the acoustic source. The valve 19 and the electrical line communicating with the spark ignition means on the acoustic source are coupled to the recorder carried by the vessel 10 to synchronize the introduction of explosive medium and the ignition thereof with the operation of said recorder. Since the recorder is generally driven by an electrical motor, synchronization of the recorder and the acoustic source can be accomplished by coupling the electrical ignition means and an electrical valve drive means to the recorder drive mechanism.

With the acoustic source, detector and recorder arranged in the above-described manner, continuous seismic profiling may be rapidly conducted. Upon activation of the recorder, oxygen and acetylene are introduced into the acoustic source. After this introduction, the valve functions to isolate the sources of oxygen and acetylene from the chamber in the impulse source. The spark ignition means is then provided with an electrical signal which functions to ignite and explode the mixture of oxygen and acetylene in the source. The force of the explosion expands the diaphragm means of the acoustic source and produces an acoustic impulse which is reflected from the strata therebeneath and received by the detector 15. The detector, in turn, provides a signal which is recorded by the seismic recorder carried by the vessel 10. In addition to producing the acoustic impulse, the explosion in the impulse source exhausts expended gas from the outlet conduit of the impulse source and into the exhaust line 14 to the atmosphere, thus preparing the acoustic source for the introduction of a new charge of oxygen and acetylene gas. Exhaustion to the atmosphere through the conduit 14 is preferable to exhaustion into the body of water 12, since it avoids the production of bubbles which interfere with seismic detection. Through repetition of this sequence, acoustic impulses may be repeatedly generated at a high rate, and a continuous seismic profile is thus obtained.

The tortuous spiral or zigzag shapes of the illustrated areally extensive combustion chambers, having inlet and outlet conduit means at opposite ends thereof, have the advantage that they facilitate exhaustion of expended explosive medium and effective combustion of fresh explosive medium. Specifically, upon combustion of the explosive medium within the tortuous chambers, the pressure produced by combustion forces substantially all of the expended medium from the combustion chamber. After combustion of one charge of explosive medium, the introduction of a new charge through the inlet conduit means at one end of the chamber further acts to force any residue of expended medium within the chamber to the end of the chamber and through the exhaust conduit means in communication therewith. Thus, there is a minimization of mixing between expended explosive medium and fresh charge of explosive medium furnished to the chamber, and any intermixing of fresh and expended medium is limited to the relatively small volume at the end of the chamber communicating with the exhaust conduit means.

Figure 10:
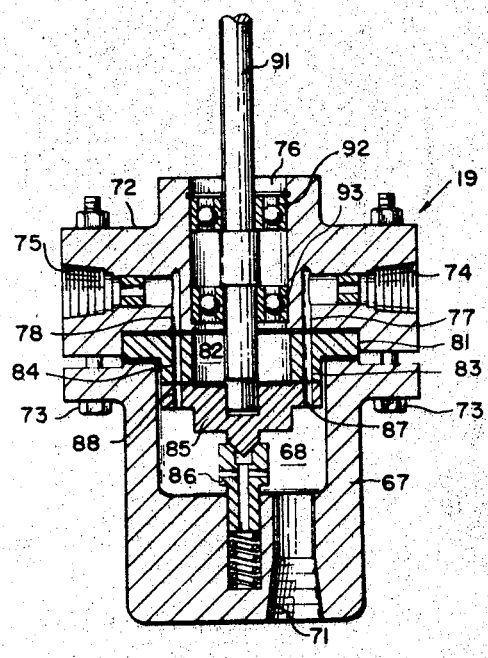
FIGURE 10 is a vertical section of a rotary valve adapted to be used in combination with any of the embodiments of the acoustic source of the present invention to introduce an explosive medium thereinto.

FIGURE 10 illustrates a rotary valve particularly suited to control the introduction of oxygen and acetylene gases into the above-described acoustic impulse sources. The valve, designated in its entirety by the numeral 19, is shown in an operative position in FIGURE 2. The valve includes a main body member 67 having a mixing chamber 68 disposed therein and an outlet port 71 extending between said mixing chamber and the exterior of the valve. The valve further includes a secondary body member 72 secured to the upper surface of the main body member 67 by bolts 73. The secondary body member 72 has inlet ports 74 and 75 extending laterally thereinto and a drive shaft opening 76 extending axially therethrough. The inlet ports 74 and 75 provide for the individual introduction of oxygen and acetylene into the valve structure. The secondary body member also includes ducts 77 and 78 communicating with the inlet ports 74 and 75 to provide for the passage of gas through the secondary body member 72 and into the mixing chamber 68 of the main body member 67.

A ceramic seat member 81 is interposed between the body members 67 and 72 in fixed relationship thereto. The ceramic seat member 80 is provided with an axial opening 82 extending therethrough in alignment with the drive shaft opening 76 of the secondary body member 72. The seat member 81 also has ducts 83 and 84 extending therethrough in alignment with the ducts 77 and 78 of the member 72. A rotary valve element 85 is disposed immediately below the seat member 81 in lapped relationship thereto. The rotary valve element 85 is forced against the seat member 81 for rotational movement with respect thereto by a spring biased piston 86 interposed between the main body 67 and a bearing portion disposed on the lower side of the rotary valve element. The rotary valve element 85 has spaced ducts 87 and 88 extending therethrough and adapted to be aligned with the ducts 83 and 84 of the seat member 81 upon proper rotational orientation with respect thereto. Rotation of the valve element 85 is accomplished through means of a drive shaft 91 extending through the openings 76 and 82 into operative engagement with a recess in the upper surface of the rotary valve element 85. The drive shaft 91 is supported for rotational movement within the secondary body member 72 by ball bearings 92 and 93 interposed between the drive shaft and the secondary body member.

From the above description, it is believed apparent that rotation of the shaft 91 will function to open and close the ducts 83 and 84 and thus control the introduction of acetylene and oxygen into the mixing chamber 68 and through the outlet port 71. In operation, the valve 19 is connected to an impulse source as exemplified by FIGURE 2. Connection may be accomplished by a nipple 94 extending between the inlet conduit of the acoustic impulse source and the outlet port 71 of the valve. Oxygen and acetylene are supplied to the valve through conduits 95 and 96 extending between the inlet ports 74 and 75 and the sources of oxygen and acetylene carried by the vessel 10. The drive shaft 91 of the valve is turned by a servo-motor 97 connected to the shaft and driven in response to an electrical impulse controlled by the recording mechanism carried by the vessel 10, as described supra. The electrical impulse is conveyed to the servo-motor 97 through electrical leads 98 extending between the motor and the recorder. The rotary valve 19 is particularly suitable for use with the impulse sources of this invention because it is well adapted for synchronization with the recorder and it effectively isolates the oxygen and acetylene in the conduits 95 and 96 and the sources carried by the vessel 10 from the explosion in the acoustic impulse source. The latter characteristic is extremely important, since ignition of the gases in the conduits 95 and 96 and in the oxygen and acetylene sources on the vessel would result in serious fouling of the apparatus if not total destruction thereof and injury to the operators. In operation of the valve 19, the rotary valve element 85 acts to clean the seat member 81 and the pressure exerted on the rotary valve element by explosions in the acoustic impulse source acts to aid in seating the rotary valve element on the seat member.

The foregoing description of the acoustic impulse sources, the valve, and other apparatus used in combination therewith is merely intended to be explanatory thereof. Various changes in the details of the illustrated constructions may be made, within the scope of the appended claims, without departing from the spirit of the invention.

What I claim as my invention:

1. An apparatus for producing high energy acoustic impulses, comprising:
    a plate having a continuous passage formed therein, said passage being longitudinally open to the exterior of the plate and extending over a substantial portion of the surface area of said plate;
    diaphragm means juxtaposed against the exterior of the plate through which the passage opens for limited translation with respect to said exterior, the boundary of the passage in the plate and said diaphragm means thus defining a closed areally extensive chamber;
    first conduit means communicating with said chamber for introducing an explosive medium thereinto;
    ignition means disposed to explode said medium in said chamber;
    and second conduit means communicating with said chamber for exhausting expended explosive medium therefrom.

2. An apparatus according to claim 1, including:
    valve means coupled to said first conduit to selectively introduce an explosive medium thereinto.

3. An apparatus according to claim 1, including:
a valve having outlet port means communicating with said first conduit means, said valve having inlet port means for introduction of an explosive medium thereinto;
and a rotary valve element interposed between said inlet and outlet port means to selectively interrupt the flow of explosive medium therebetween.

4. An apparatus for producing high energy acoustic impulses, comprising:
a plate having a thin continuous groove formed in a surface thereof, said groove extending over a substantial portion of the area of said surface;
a diaphragm juxtaposed against the surface of the plate having the groove formed therein for limited translation with respect to said surface, the boundary of the groove in the plate and said diaphragm thus defining a closed areally extensive chamber;
first conduit means communicating with said chamber for introducing an explosive medium thereinto;
ignition means disposed to explode said medium in said chamber;
and second conduit means communicating with said chamber for exhausting expended explosive medium therefrom.

5. An apparatus according to claim 4 wherein the groove formed in the surface of the plate is of a tortuous configuration.

6. An apparatus according to claim 4 wherein said groove formed in the surface of the plate is of a spiral configuration.

7. An apparatus according to claim 4 wherein:
said first conduit means communicates with said chamber at one end thereof;
said second conduit means communicates with said chamber at the other end thereof; and,
said ignition means extends into said chamber near said first end thereof.

8. An apparatus for producing high energy acoustic impulses comprising:
a plate having a groove formed in a surface thereof, said groove extending over a substantial portion of the area of said surface;
a diaphragm juxtaposed against the surface of the plate having the groove formed therein for limited translation with respect to said surface, the boundary of the groove in the plate and said diaphragm thus defining a closed areally extensive chamber;
first conduit means communicating with said chamber for introducing an explosive medium thereinto;
ignition means extending into said first conduit means to establish a detonation front in an explosive medium disposed therein;
and, second conduit means communicating with said chamber for exhausting expended explosive medium therefrom.

9. An apparatus for producing high energy acoustic impulses, comprising:
a plate having a continuous groove formed in the surface thereof, said groove extending over a substantial portion of the area of said surface;
a resilient diaphragm secured to the surface of the plate having the groove formed therein, the boundary of the groove in the plate and the diaphragm thus defining a closed areally extensive chamber;
first conduit means communicating with said chamber for introducing an explosive medium thereinto;
ignition means disposed to explode said medium in said chamber;
and second conduit means communicating with said chamber for exhausting expended explosive medium therefrom.

10. An apparatus for producing high energy acoustic impulses, comprising:
a plate having a groove formed in the surface thereof, said groove extending over a substantial portion of the area of said surface;
a rigid diaphragm juxtaposed against the surface of the plate having the groove formed therein, the boundary of the groove in the plate and the diaphragm thus defining a closed areally extensive chamber;
resilient means securing said diaphragm against the surface of the plate having the groove therein for limited translation with respect to said surface;
first conduit means communicating with said chamber for introducing an explosive medium thereinto;
ignition means disposed to explode said medium in said chamber;
and second conduit means communicating with said chamber for exhausting expended explosive medium therefrom.

11. An apparatus for producing high energy acoustic impulses, comprising:
a plate having opposed surfaces, said plate having an opening therein extending through said surfaces;
diaphragms juxtaposed against said opposed surfaces for limited translation with respect thereto, the boundary of the opening in the plate and said diaphragms thus defining a closed chamber;
first conduit means communicating with said chamber for introducing an explosive medium thereinto;
ignition means disposed to explode said medium in said chamber;
and second conduit means communicating with said chamber for exhausting expended explosive medium therefrom.

12. The apparatus according to claim 11 wherein the said opening in said plate has a tortuous configuration and extends over a substantial portion of the area of said surfaces.

13. An apparatus for producing high energy acoustic impulses, comprising:
a plate having opposed surfaces, said plate having an opening therein extending through said surfaces;
rigid diaphragms juxtaposed against said opposed surfaces, the boundary of the opening in the plate and said diaphragms thus defining a closed chamber;
resilient means securing said diaphragms against said opposed surfaces of the plate for limited translation with respect thereto;
first conduit means communicating with said chamber for introducing an explosive medium thereinto;
ignition means disposed to explode said medium in said chamber;
and second conduit means communicating with said chamber for exhausting expended explosive medium therefrom.

14. An apparatus according to claim 13 wherein the said opening in said plate has a tortuous configuration and extends over a substantial portion of the area of said surfaces.

References Cited by the Examiner
UNITED STATES PATENTS

| | | | |
|---|---|---|---|
| 1,641,664 | 9/1927 | De Forest | 340—12 |
| 1,867,098 | 7/1932 | Rieber | 181—.5 |
| 2,772,746 | 12/1956 | Merten | 181—.5 |
| 3,064,753 | 11/1962 | McClure | 181—.5 |

BENJAMIN A. BORCHELT, *Primary Examiner.*

CHESTER L. JUSTUS, SAMUEL FEINBERG,
*Examiners.*